Aug. 29, 1933.       W. J. ANDRES       1,924,589
BRAKE

Original Filed Oct. 11, 1926

INVENTOR
WILLIAM J. ANDRES
BY
ATTORNEY

Patented Aug. 29, 1933

1,924,589

UNITED STATES PATENT OFFICE 1,924,589

BRAKE

William J. Andres, South Bend, Ind., assignor to Bendix Brake Company, South Bend, Ind., a corporation of Illinois Application October 11, 1926, Serial No. 140,762
Renewed February 5, 1931

11 Claims. (Cl. 188—10)

This invention relates to brakes and is illustrated as embodied in an automobile chassis having brakes on all four wheels and provided with novel mechanism for operating the four brakes. An object of the invention is to provide simple connections forming the brake-operating mechanism, preferably in a manner eliminating the usual cross shafts and substituting inexpensive tension connections therefor. In one desirable arrangement there is a lever on each side of the vehicle, shown pivoted on the side member of the chassis frame, which has three arms, one of which is connected to the front brake on that side, and the second of which is connected to the rear brake on that side. The third arm of the two side levers are connected to the first and second arms of the same lever, shown pivoted on a cross member of the chassis frame, and which has this third arm connected to the service pedal or an equivalent operating lever.

The above and other objects and features of the invention, including various novel and desirable details of construction, will be apparent from the following description of one illustrative embodiment shown in the accompanying drawing, in which.

Figure 1:
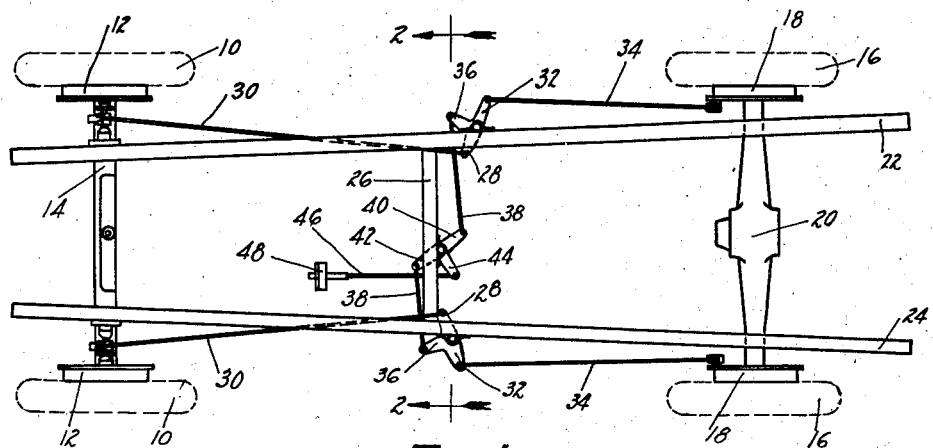
Figure 1 is a diagrammatic top plan view of an automobile chassis showing the novel connections.
Figure 2:
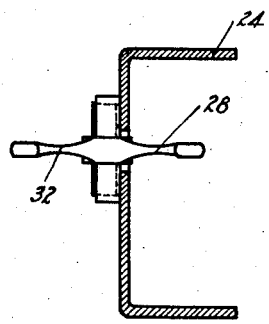
Figure 2 is a section through one of the side members of the chassis frame on the line 2—2 of Figure 1 and showing the pivoting thereon of one of the three-arm levers.

The chassis illustrated includes front wheels 10 having brakes 12 and supporting a front axle 14, and rear wheels 16 having brakes 18 and supporting a rear axle 20. The axles 14 and 20 support, through the usual springs, a suitable chassis frame including side members 22 and 24 and cross members, one of which is shown at 26.

Figure 3:
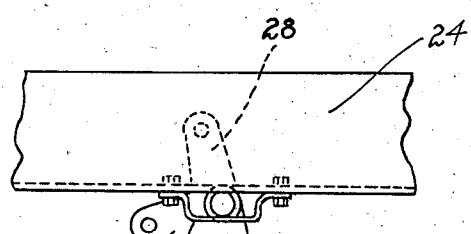
Figure 3 is a top plan view of one lever, on a larger scale than Figure 1, and showing a modified mounting.

According to an important feature of the present invention, there is pivoted on each of the side members 22 and 24 a lever having its first arm 28 connected by a tension member 30 with a front brake 12 on that side, and having its second arm 32 connected by a tension member 34 to the rear brake on that side. The third arms 36 of these two levers are connected by tension members 38 to arms 40 and 42 of a third three-arm lever pivoted on the cross member 26 and having its third arm 44 connected by a tension member 46 to the service pedal or equivalent operating lever 48. If desired, the three three-arm levers may be identical and interchangeable; and if it is preferred to equalize the tension on the members operated by one or more of the three-arm levers, that lever may be mounted in such a manner that its fulcrum can float, for example by mounting the fulcrum in a slot formed by a bracket 60 (Figure 3).

While one illustrative embodiment of the invention has been described in detail, it is not my intention to limit its scope to that particular embodiment or otherwise than by the terms of the appended claims.

I claim:

1. A vehicle having a chassis frame provided with front wheels having brakes and with rear wheels having brakes, and comprising, in combination with said front and rear brakes, horizontally-swinging levers pivoted on the frame and slidable longitudinally thereof at opposite sides of the vehicle and each of which is connected to the front and rear brakes on its side of the vehicle, and a third horizontally swinging lever interchangeable with and arranged to operate both of said levers.

2. A vehicle including a chassis frame and a cross member having at least two brakes at each of its sides, and having, in combination with said brakes, a lever mounted to swing in a substantially horizontal plane and pivoted adjacent each side of the vehicle and slidable longitudinally thereof, connections from each lever to the brakes on the same side of the vehicle, a third lever pivoted directly on the cross member and directly connected with the said levers and adapted to operate all of the brakes.

3. A vehicle having at least two brakes at each of its sides, and having, in combination with said brakes, a lever pivoted adjacent each side of the vehicle and having a limited movement longitudinally thereof, connections from each lever to the brakes on the same side of the vehicle, and operating connections for the two levers for causing them to operate simultaneously including a third lever interchangeable with said levers slidable laterally of the vehicle, tension connections extending crosswise of the vehicle and connected to said levers and which tension connections are moved lengthwise in applying the brakes.

4. Braking mechanism for vehicles, having a frame, front and rear pairs of wheels, a brake for each wheel provided with actuating means and manually-controlled power-applying means, comprising a system of inextensible tension members flexibly connected at one end to said power-applying means and at the other end to the respective brake-actuating means and having an intermediate pivotally and laterally and bodily movable power-transmitting means and means operable thereby to equalize the power applied by the power-applying means to the respective brake-actuating means.

5. Braking mechanism for vehicles having a chassis comprising side frames, front and rear pairs of wheels, with a brake for each wheel provided with actuating means and manually-controlled power-applying means, comprising tension members connected to the respective brake-actuaitng means extending longitudinally of the frame, bell-crank levers pivotally mounted upon the side frames connected to said tension members, transverse tension members connected to said bell-crank levers, an intermediate bell-crank lever having a floating fulcrum pivotally connected to said frame, said transverse tension members being connected to said side frame bell-crank levers and so connected to said intermediate bell-crank lever as to equalize power transmitted therethrough to said tension members and an inextensible link connecting said intermediate bell-crank lever to said power-applying means.

6. Braking mechanism for vehicles, having a plurality of pairs of wheels, a brake for each wheel provided with actuating means and manually-controlled power-applying means, comprising unyielding tension members connecting said power-applying means to said brake-actuating means, including unyielding power-transmitting means operable to equalize the power applied by the brake lever to all of the respective brake-actuating means and to transmit such power unyieldingly to the respective brakes.

7. Braking mechanism for vehicles, having a plurality of pairs of wheels, a brake for each wheel provided with actuating means and manually-controlled power-applying means, a system of inextensible tension members flexibly connected at one end to said manually-controlled power-applying means and at the remote end to said respective brake-actuating means and having intermediate unyielding power-transmitting members operable to equalize the power applied by said power-applying means to all of the respective brake-actuating means and to transmit such power unyieldingly to the respective brakes.

8. A four wheel brake system for automotive vehicles having in combination, a frame having wheels journaled at opposite ends thereof, brakes controlling the rotation of said wheels, and means for equalizing the pressure applied to said brakes, said means including an equalizer bar, means for supporting and guiding said equalizer bar in a substantialy horizontal plane, actuating means for said equalizer bar, links pivoted to said equalizer bar, and levers pivoted to said links, one end of said levers being connected to the brakes on the rear wheels and the other end of said levers being connected by suitable linkage to the brakes on the front wheels.

9. A vehicle having a chassis frame and provided with front wheels having brakes and rear wheels having brakes, and comprising brackets secured on each side to the frame at opposite sides of the vehicle, levers mounted for pivotal and for longitudinal sliding movement in said brackets, connections extending between each of said levers and the front and rear brakes on the corresponding sides of the vehicle and means for operating said levers.

10. A vehicle having front wheels having brakes and rear wheels having brakes, and comprising in combination a pair of levers, one pivoted at each side of the vehicle so as to be slidable longitudinally thereof and each formed with three arms, the first arm connected with the front brake on that side and a second arm connected with the rear brake on that side, a third lever substantially the same as and interchangeable with the said two first named levers pivoted on the vehicle and also having three arms, the first and second arms of the third lever being connected respectively to the third arms of the first two levers, an operating lever, and a connection from the operating lever to the third arm of said third lever.

11. In an automobile, a frame, forward road wheels for supporting said frame, rearward road wheels for supporting said frame, brakes for each of said wheels, a shaft, means for supporting said shaft upon said frame for movement of rotation and for movement of translation in a substantially horizontal plane extending substantially forwardly and rearwardly of said frame, an arm secured to said shaft and extending radially of the longitudinal axis thereof, a second arm secured to said shaft and extending substantially opposite to said first named arm, a connection between one said arm and one said forward wheel brake, a connection between the other of said arms and one said rearward wheel brake, an actuating lever, and a connection between said actuating lever and said shaft for rotating said shaft.

WILLIAM J. ANDRES.